US010872351B2

(12) United States Patent
Lee et al.

(10) Patent No.: US 10,872,351 B2
(45) Date of Patent: Dec. 22, 2020

(54) METHOD AND DEVICE FOR PROVIDING ADVERTISEMENT

(71) Applicant: SK Planet Co., Ltd., Seongnam-si, Gyeonggi-do (KR)

(72) Inventors: Jongsoo Lee, Seoul (KR); Hokeun Jeon, Seoul (KR); Jungmin Park, Seoul (KR)

(73) Assignee: SK Planet Co., Ltd., Seongnam-si (KR)

( * ) Notice: Subject to any disclaimer, the term of this patent is extended or adjusted under 35 U.S.C. 154(b) by 242 days.

(21) Appl. No.: 15/393,032

(22) Filed: Dec. 28, 2016

(65) Prior Publication Data

US 2017/0316460 A1    Nov. 2, 2017

(30) Foreign Application Priority Data

Apr. 28, 2016  (KR) .......................... 10-2016-0051918
Jun. 14, 2016  (KR) .......................... 10-2016-0073718

(51) Int. Cl.
  *G06Q 30/02*   (2012.01)
  *G06F 3/0481*  (2013.01)
(52) U.S. Cl.
  CPC ..... *G06Q 30/0257* (2013.01); *G06Q 30/0267* (2013.01); *G06F 3/0481* (2013.01)
(58) Field of Classification Search
  USPC ...... 705/14.39, 14.4, 14.58, 14.49; 709/219; 726/3
  See application file for complete search history.

(56) References Cited

U.S. PATENT DOCUMENTS

| 5,809,481 A   | * | 9/1998 | Baron ..................... G06Q 30/02 705/14.4 |
| 7,979,880 B2  | * | 7/2011 | Hosea ............... H04N 21/25891 709/219 |
| 2002/0128907 A1 | * | 9/2002 | Sato ...................... G06Q 30/02 705/14.49 |
| 2008/0010133 A1 | * | 1/2008 | Pyhalammi ........... G06Q 30/00 705/14.58 |
| 2011/0197261 A1 | * | 8/2011 | Dong .................... G06Q 30/02 726/3 |
| 2012/0203622 A1 | * | 8/2012 | Bennett ............. G06Q 30/0207 705/14.39 |

FOREIGN PATENT DOCUMENTS

| KR | 10-2010-0062524 A | 6/2010 |
| KR | 10-2016-0040918 A | 4/2016 |

OTHER PUBLICATIONS

Korean Office Action dated Jan. 18, 2017 corresponding to Korean Application No. KR 10-2016-0073718.

* cited by examiner

*Primary Examiner* — Saba Dagnew
(74) *Attorney, Agent, or Firm* — Fenwick & West LLP

(57) ABSTRACT

The present invention relates to a method and device for providing an advertisement, in which a service device extracts a list of customers to be targeted based on authentication based information, and a user terminal device corresponding to the extracted list of customers collects non-authentication based information to provide an advertisement to an advertisement target application operated by a third party, and a recording medium in which a computer program for performing the method is recorded.

5 Claims, 10 Drawing Sheets

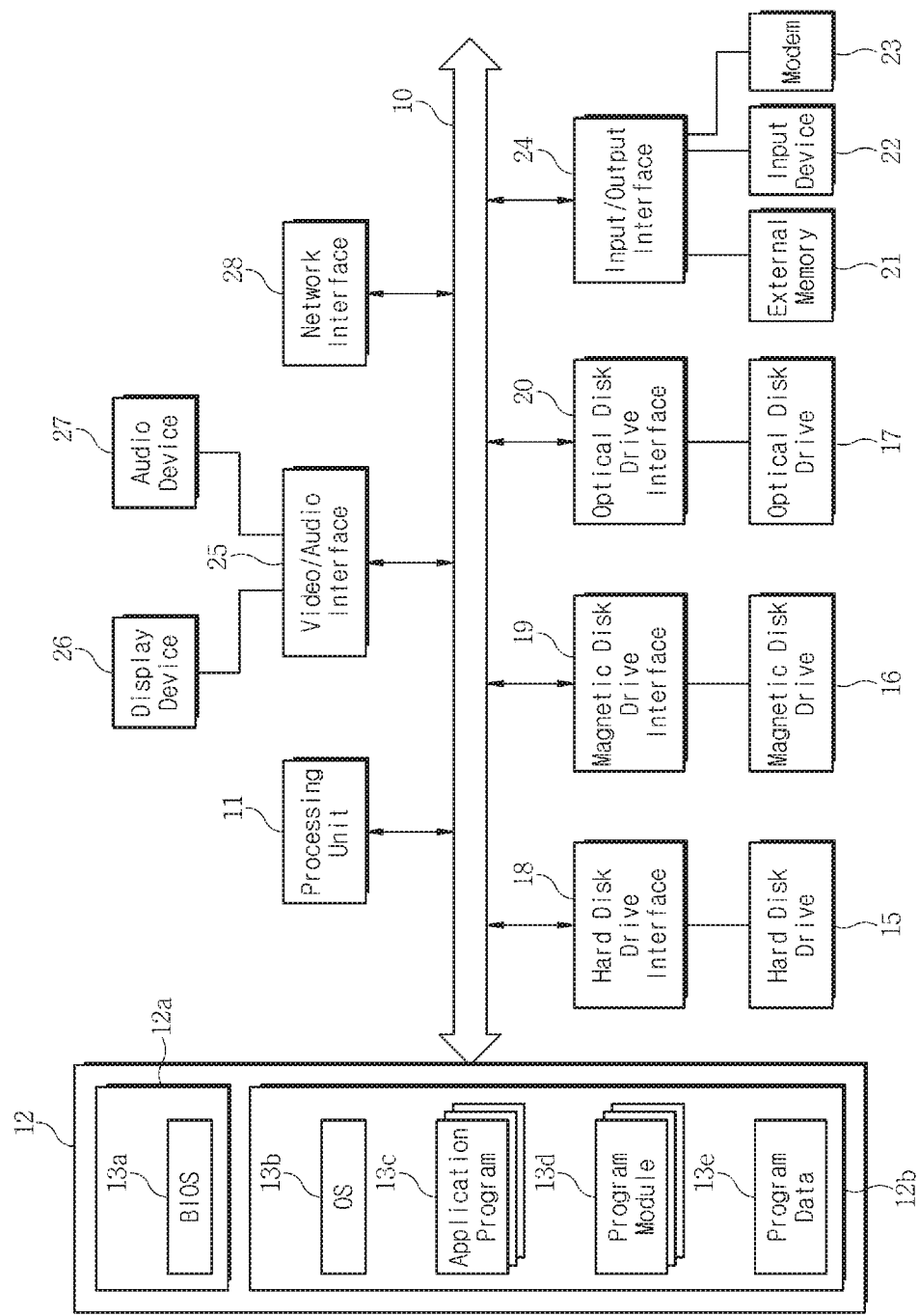

METHOD AND DEVICE FOR PROVIDING ADVERTISEMENT

CROSS-REFERENCE TO RELATED APPLICATION

This application claims priority to and the benefit of Korean Patent Application No. 10-2016-0051918 and 10-2016-0073718 filed in the Korean Intellectual Property Office on Apr. 28, 2016 and Jun. 14, 2016 respectively, the entire contents of which are incorporated herein by reference.

TECHNICAL FIELD

The present invention relates to a method and device for providing an advertisement and a recording medium in which a computer program for performing the method is recorded, and more particularly, to an advertisement providing method in which a list of customers to be targeted on the basis of personal information is extracted, information on conditions for providing an advertisement to user terminal devices corresponding to the extracted list of customers is provided, whether the conditions for providing an advertisement are satisfied is checked by the user terminal devices according to an inquiry from an advertisement target application, and, when the conditions are satisfied, app activity information of the user terminal devices, advertisement-specific user identification information, or communication program module information of an advertisement target application is collected and an advertisement is provided, a device therefor, and a recording medium in which a computer program for performing the method is recorded.

BACKGROUND

This section is intended to merely provide background for embodiments of the present invention and is not considered prior art in the claims.

With the development of mobile communication networks and the advance in terminal specifications, mobile communication terminals have become a necessity for modern people and have evolved into total entertainment equipment beyond the category of simple communication devices or information provision devices.

At the same time, the use of smartphones in which a function of a communication terminal and a function of a personal digital assistant (PDA) are combined has recently become popular. A smartphone is an intelligent terminal in which computer-assisted functions such as Internet communication and information search are added to a cellular phone. Compared to an existing communication terminal, a large memory, a highly efficient central processing unit (CPU), and an operating system (OS) which supports the execution of various applications, voice/data communication, and linkage with a personal computer (PC) are embedded in a smartphone.

With the development of various mobile devices such as a smartphone and a tablet PC and the expansion of a market size for applications that operate in such mobile devices, a mobile-based advertisement service has also been sharply expanded.

A mobile-based advertisement service may be provided to unspecified individuals. However, because various forms of advertisement are already being provided in the current mobile communication and mobile environments, exposing a product advertisement to unspecified individuals brings about a negative feeling for a user and does not lead to product sales. For example, it can easily be expected that probabilities of leading to purchase would be significantly different for cases in which the same razor advertisement is transmitted to a male in his thirties and a female in her twenties.

To overcome such a limitation, an advertisement technology in which personal information (information based on demographic data such as the gender and age of a person) on a user of a mobile device is utilized, and an advertisement banner is provided by being targeted to a customer suitable to receive the advertisement has been developed.

However, due to the growing importance of personal information nowadays, the indiscriminate collection of personal information is becoming a problem. As a result, a method of providing an advertisement by targeting a customer without collecting personal information has been demanded.

SUMMARY

The present invention is directed to providing a method of providing an advertisement in a mobile environment, in which, when collecting authentication based information, extracting a list of customers to which an advertisement will be provided, and providing a targeting advertisement, non-authentication based information including one or more of app activity information of the targeted customers, advertisement-specific user identification information, or communication program module information of an advertisement target application is collected, and an advertisement is provided to the advertisement target application.

Here, the present invention is also directed to providing an advertisement providing method in which information on conditions for providing an advertisement to targeted customers is sent to and stored in a service application in a user terminal device in advance, non-authentication based information is collected when the conditions are satisfied, and an advertisement is provided to an advertisement target application.

Here, the advertisement target application is an application whose management authority is not owned by a subject of the present invention, and the present invention is also directed to providing an advertisement providing method in which an advertisement is provided to a user of an advertisement target application who has a propensity similar to those of targeted customers.

Particularly, the present invention is also directed to providing an advertisement providing method in which, when an advertisement target application queries a service application about whether advertisement condition information is satisfied, the service application checks whether the advertisement condition information is satisfied, and an advertisement is loaded from the service application according to needs of the advertisement target application.

Technical problems to be solved by the present invention are not limited to those mentioned above, and other unmentioned technical problems to be solved by the present invention should be clearly understood by one of ordinary skill in the art to which the present invention pertains from the description below.

One aspect of the present invention provides an advertisement providing method which includes extracting, by a service device, a list of customers to be targeted based on authentication based information which is already authenticated information on a customer to which a service is provided from the service device, requesting and collecting non-authentication based information generated for each user terminal device without authentication in any advertisement target application through a service application in a user terminal device corresponding to the extracted list of customers, and transmitting the non-authentication based information to a corresponding advertisement target application server to request that an advertisement be executed for a customer corresponding to the non-authentication based information.

Also, the advertisement providing method using a service device according to an aspect of the present invention may further include, before the extracting, receiving the authentication based information from an authentication information based database in the service device or a service application installed in a user terminal device.

Also, the advertisement providing method may further include making a request that the service application execute an advertisement for a customer corresponding to the authentication based information.

Also, the non-authentication based information may include one or more of app activity information by operation of a service application, advertisement-specific user identification information related to an operating system (OS) installed in a user terminal device, and communication module information of the advertisement target application.

Also, the requesting and collecting of the non-authentication based information may include transmitting advertisement condition information to the service application in the user terminal device corresponding to the extracted list of customers, receiving, by the service application, a request to check the advertisement condition information from the advertisement target application in the user terminal device and checking a connection state with a wireless communication device to check whether the advertisement condition information is satisfied, and, when, as a result of the checking, the advertisement condition information is satisfied, requesting and collecting the non-authentication based information.

Also, the advertisement condition information may include one or more of identification information of the wireless communication device connected to the user terminal device and information on a period or an amount for time in which the user terminal device is connected to the wireless communication device.

Also, the advertisement providing method may further include receiving, by the service device, the non-authentication based information and an advertisement request from the advertisement target application and transmitting an advertisement to be provided to the advertisement target application or may further include transmitting, by the service device, an advertisement to be provided to the advertisement target application to the advertisement target application server.

Another aspect of the present invention provides an advertisement providing method, which is an advertisement providing method using a user terminal device, that includes receiving, by a service application, a request for non-authentication based information generated for each user terminal device without authentication in any advertisement target application from a service device, checking, by the service application, whether the advertisement target application is installed, and, when the advertisement target application is installed, extracting, by the service application, the non-authentication based information and transmitting the non-authentication based information to the service device.

Also, the advertisement providing method may further include displaying, by the service application, whether the request for the non-authentication based information is received on a notification bar. The checking and the transmitting may be performed after the service application receives a predetermined input from a user through the notification bar.

In addition, another aspect of the present invention provides a service device that includes a communication unit configured to communicate with a user terminal device or an advertisement target application server, a control unit configured to extract a list of customers to be targeted based on authentication based information which is already authenticated information on a customer of a service provided by the service device, request and collect non-authentication based information generated for each user without authentication in any advertisement target application through a service application in a user terminal device corresponding to the extracted list of customers, and transmit the non-authentication based information to a corresponding advertisement target application server to request that an advertisement be executed for a customer corresponding to the non-authentication based information, and a storage unit configured to store the authentication based information and the non-authentication based information.

Also, the control unit may transmit advertisement condition information to the user terminal device corresponding to the extracted list of customers.

Also, still another aspect of the present invention provides a user terminal device that includes a communication unit configured to communicate with a service device, a storage unit configured to store a service application and advertisement condition information, and a control unit configured to check a connection state with a wireless communication device and check whether the advertisement condition information is satisfied when the service application has received a request to check whether the advertisement condition information is satisfied from an advertisement target application in the user terminal device, collect non-authentication based information generated for each user terminal device without authentication, and transmit the non-authentication based information to the advertisement target application to request that an advertisement be executed for a customer based on the non-authentication based information.

Further, yet another aspect of the present invention provides an advertisement providing system that includes a service device and a user terminal device.

In addition, yet another aspect of the present invention provides a computer readable recording medium in which a program for executing the advertisement providing method described above is recorded.

According to the present invention, the advertisement providing method includes collecting, by a service device, authentication based information and extracting a list of customers to which an advertisement will be provided, sending information on conditions for providing an advertisement to the targeted customers to a service application in a user terminal device to be stored therein in advance, and, when the conditions are satisfied, collecting non-authentication based information that includes one or more of app activity information of the targeted customers, advertisement-specific user identification information, and communication program module information of an advertisement target application and providing an advertisement to the advertisement target application. In this way, targets of an advertisement can be expanded, and a result of the advertisement can be predicted.

That is, the advertisement can be provided to an advertisement target application user who has a propensity similar to those of the list of customers extracted by the service device, and a result of providing the advertisement to the advertisement target application user can be predicted on the basis of a result acquired by providing the advertisement according to the extracted list of customers.

Here, whether advertisement condition information is satisfied is checked using a nearby wireless communication device and the non-authentication based information in the user terminal device. In this way, an occurrence of a problem caused by collecting personal information can be reduced.

Also, the advertisement target application selects a time point for checking the advertisement condition information and queries the service application about whether the advertisement condition information is satisfied. In this way, the advertisement target application can load advertisement content from the service application at a desired time point and use the advertisement content.

Advantageous effects that can be obtained by the present invention are not limited to those mentioned above. Other unmentioned advantageous effects should be clearly understood by one of ordinary skill in the art to which the present invention pertains from the descriptions below.

BRIEF DESCRIPTION OF THE DRAWINGS

FIG. 12 is a view illustrating an operating environment of a device for performing an advertisement providing method according to an embodiment of the present invention.

DETAILED DESCRIPTION

Figure 1:
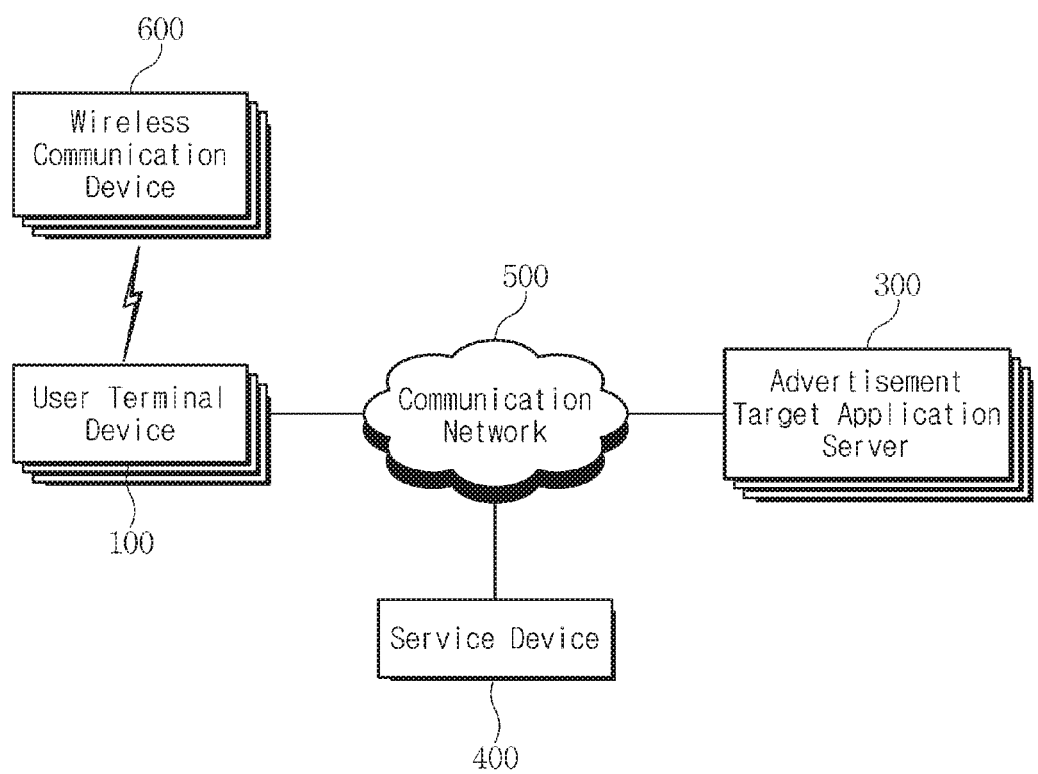
FIG. 1 is a block diagram schematically illustrating an overall system for performing an advertisement providing method according to an embodiment of the present invention.

Hereinafter, the present invention will be described in more detail with reference to particular embodiments of the present invention illustrated in the accompanying drawings to further clarify features and advantages of the technical solution of the present invention.

However, detailed descriptions of known functions or configurations that may obscure the gist of the present invention will be omitted in the description below and the accompanying drawings. Also, it should be noted that like elements are represented with like reference numerals when possible throughout the drawings.

Terms or words used in the description below and the drawings are not to be limitedly construed as having general or dictionary meanings but should be construed as having meanings and concepts consistent with the technical spirit of the present invention based on a principle that the inventor may properly define terms as having concepts for describing his or her invention in the best way.

Consequently, because embodiments described herein and configurations illustrated in the drawings are merely the most preferred embodiments of the present invention and do not represent all of the technical spirit of the present invention, it should be understood that various equivalents and modified embodiments that may substitute for the most preferred embodiments may be present at the time of submitting this application.

Also, terms including ordinals such as first and second may be used to describe various elements. The terms are only used for the purpose of distinguishing one element from another element and are not used to limit the elements. For example, a second element may be referred to as a first element, and likewise, a first element may also be referred to as a second element while not departing from the scope of the present invention.

Furthermore, when it a certain element is described as being "connected" or "linked" to another element, it means that the certain element may be logically or physically connected or linked to the other element.

In other words, it should be understood that, although an element may be directly connected or linked to another element, yet another element may exist therebetween, and the element may be indirectly connected or linked to the other element.

Also, terms such as "include" or "have" used herein should be understood as designating that features, number, steps, operations, elements, parts, or combinations thereof exist and not as precluding the existence or the possibility of adding one or more other features, numbers, steps, operations, elements, parts, or combinations thereof in advance.

Also, terms such as "unit." "-or," and "module" represent a unit for processing one or more functions or operations. Such a unit may be implemented by hardware, software, or a combination of hardware and software.

Also, "a/an," "one," "the," and words similar thereto may be used as if they have both singular and plural meanings in the context of describing the present invention (particularly, in the context of the claims below) unless indicated otherwise herein or clearly contradicted in context.

Hereinafter, keywords that are used hereinafter for describing the present invention will be defined.

A user refers to a person who receives a customer-targeted service (a mobile marketing providing application service, a mobile wallet application service, and the like) provided by a service device that constitutes the present invention.

Authentication based information is already authenticated information related to a customer that is collected by the customer-targeted service provided by a service device being operated. The authentication based information includes personal information, such as a cellular phone number, and connecting information (CI) capable of identifying an individual, which is protected by the Personal Information Protection Act.

Non-authentication based information is information generated without authentication by a service device and is volatile information as well as non-personal non-identifying information, that are not combined with authentication based information. The non-authentication based information may include app activity information by an operation of a service application, advertisement-specific user identification information related to an operating system (OS) installed in a user terminal device, or communication module information of an advertisement target application.

App activity information is information collected as a user uses a service application installed in his or her terminal device and may include information on at least one of clicking a banner within the service application, generation of a marketing event, a purchase history through the service application, and the like.

Hereinafter, a method and device for providing an advertisement and a computer readable recording medium in which a program for executing the method is recorded will be described in detail with reference to the accompanying drawings.

First, each device connected to a service device and an overall system according to an embodiment of the present invention will be described.

FIG. 1 is a block diagram schematically illustrating an overall system for performing an advertisement providing method according to an embodiment of the present invention.

As illustrated in FIG. 1, an advertisement providing system according to an embodiment of the present invention may include one or more user terminal devices 100, one or more advertisement target application servers 300, a service device 400, a wireless communication device 600, and a communication network 500 configured to connect the above elements.

The user terminal device 100 according to an embodiment of the present invention may be a general mobile communication terminal device. A mobile communication terminal device refers to a network device capable of transmitting and receiving various types of data by connecting to a wireless communication network provided by the present invention.

Here, the user terminal device 100 may be substituted by another term such as a terminal, user equipment (UE), a mobile station (MS), a mobile subscriber station (MSS), a subscribed station (SS), an advanced mobile station (AMS), a wireless terminal (WT), a machine-type communication (MTC) device, a machine-to-machine (M2M) device, a device-to-device (D2D) device, a station (STA), and the like.

However, the user terminal device 100 is not limited thereto, and any device connected to the wireless communication network provided by the present invention may correspond to the user terminal device 100. Units in an equivalent level as the units mentioned above may be used as the user terminal device 100 according to the present invention.

The user terminal device 100 may perform voice or data communication through the wireless communication network provided by the present invention. For this, the user terminal device 100 of the present invention may include a browser configured to transmit and receive information, a memory configured to store a program and a protocol, and a microprocessor configured to run various types of programs to perform computing and control.

The user terminal device 100 according to an embodiment of the present invention may be implemented in various forms. For example, mobile terminals, such as smartphones, tablet personal computers (PCs), personal digital assistants (PDAs), portable multimedia players (PMPs), and MPEG-1 layer3 (MP3) players may be used as the user terminal device 100 described herein.

Particularly, the user terminal device 100 according to the present invention includes a service application connected to the service device 400 to receive a customer-targeted service provided by the service device 400 and any application configured to directly or indirectly receive advertisement content generated in the service device according to an embodiment of the present invention (hereinafter, an advertisement target application) to provide the advertisement content to a user.

The advertisement target application is an application whose management authority is not owned by a subject of the present invention. The advertisement target application may include an application linked to a movie theater, a department store, a mart, and the like to provide a service and may include all other applications installed in a mobile environment and capable of providing an advertisement.

Also, when the user terminal device 100 according to an embodiment of the present invention receives a push message that requests non-authentication based information from the service device 400, the user terminal device 100 may extract the requested non-authentication based information, transmit the non-authentication based information to the service device 400, and check whether the advertisement target application is installed.

Also, the user terminal device 100 according to another embodiment of the present invention may receive information related to advertisement condition information including one or more of a location, a date, a day, and time from the service device 400, extract the non-authentication based information, and transmit the non-authentication based information to the service device 400.

Specific configurations of the user terminal device 100 according to an embodiment of the present invention will be described in more detail below.

The advertisement target application server 300 is an element that serves to manage any advertisement target application installed in the user terminal device 100. The advertisement target application server 300 may be a web application server (WAS), an Internet information server (IIS), a known web server on the Internet using Apache Tomcat or Nginx, or a Cache server. Moreover, one of devices given as an example of a device constituting a network computing environment may be the advertisement target application server 300 according to an embodiment of the present invention.

Also, the advertisement target application server 300 supports an OS such as Linux or Windows and may execute a received control command. In terms of software, the advertisement target application server 300 may include a program module implemented through a language such as C, C++, Java, Visual Basic, and Visual C.

Particularly, the advertisement target application server 300 according to an embodiment of the present invention may receive an advertisement request for the user terminal device 100 from the service device 400 and provide an advertisement to the user terminal device 100 when the user terminal device 100 runs the advertisement target application and connects to the advertisement target application server 300.

Also, the advertisement target application server 300 according to another embodiment of the present invention may receive advertisement content from the service device 400 and transmit the advertisement content to the advertisement target application.

The service device 400 is a server device for providing an advertisement to the advertisement target application provided by a third party and whose management authority is not owned by the service device 400 according to an embodiment of the present invention. The service device 400 may be implemented by an existing service server configured to provide the customer-targeted service including an advertisement (e.g., a mobile marketing providing application service, a mobile wallet application service, and the like).

The service device 400 according to an embodiment of the present invention is an element for expanding targets of an advertisement by extracting a list of customers based on authentication based information, targeting the user terminal device 100 from which non-authentication based information will be collected, and providing the non-authentication based information to the advertisement target application server 300.

Also, the service device 400 may transmit a push message that includes a non-authentication based information collection command to the user terminal device 100 to collect the non-authentication based information from the user terminal device 100.

The service device 400 according to another embodiment of the present invention is a configuration for transmitting advertisement condition information to the user terminal device 100 corresponding to an extracted list of customers and transmitting advertisement content to the advertisement target application or the advertisement target application server 300.

The service device 400 may include authentication based information pre-stored in an authentication based information database therein, and may collect authentication based information from a service application installed in the user terminal device 100.

The service device 400 may be a known web server such as the advertisement target application server 300. Although illustrated as a single device in FIG. 1, the service device 400 may be formed of a set of server devices separated for each available service, and may include a push server device configured to transmit and receive a push message.

Specific configurations of the service device 400 according to an embodiment of the present invention will be described in more detail below.

Further, the service device 400 of the present invention may be connected via the communication network 500 to the user terminal device 100 for practicing the present invention. The communication network 500 refers to a network capable of transmitting and receiving data to and from an Internet protocol using various wired and wireless communication technologies such as an Internet network, an Intranet network, a mobile communication network, and a satellite communication network.

Also, the communication network 500 is combined with the advertisement target application server 300 or the user terminal device 100 and stores computing resources such as hardware and software. The communication network 500 is a concept that collectively refers to a closed network such as a local area network (LAN) and a wide area network (WAN), an open network such as the Internet, a network such as code division multiple access (CDMA), wideband CDMA (WCDMA), global system for mobile communication (GSM), long term evolution (LTE), and evolved packet core (EPC), and next-generation networks and computing networks that will be realized in the future.

Further, the communication network 500 of the present invention may include, for example, a plurality of connection networks (not illustrated) and a core network (not illustrated), and may include an external network, e.g., an Internet network (not illustrated).

Here, the connection networks (not illustrated) are connection networks that perform wired and wireless communication with mobile communication terminal devices, and may be implemented with a plurality of base stations (BSs) such as a BS, a base transceiver station (BTS). NodeB, and eNodeB and a base station controller (BSC) such as a BSC and a radio network controller (RNC).

Also, as described above, a digital signal processor and a wireless signal processor that have been integrally implemented with the BSs may be differentiated as a digital unit (hereinafter, referred to as a DU) and a radio unit (hereinafter, referred to as an RU), a plurality of RUs (not illustrated) may be installed in a plurality of areas, and the plurality of RUs (not illustrated) may be connected to a centralized DU (not illustrated).

Also, the core network (not illustrated) that configures a mobile network with the connection networks (not illustrated) serves to connect the connection networks (not illustrated) to an external network, e.g., the Internet network (not illustrated).

As described above, the core network (not illustrated) is a network system that performs a main function for a mobile communication service such as mobility control and switching between the connection networks (not illustrated). The core network (not illustrated) performs circuit switching or packet switching and manages and controls a packet flow within the mobile network.

Also, the core network (not illustrated) may manage mobility between frequencies and may serve to link traffic within the connection networks (not illustrated) and the core network (not illustrated) to another network, e.g., the Internet network (not illustrated). The core network (not illustrated) may further include a serving gateway (SGW), a public data network (PDN) gateway (PGW), a mobile switching center (MSC), a home location register (HLR), a mobile mobility entity (MME), and a home subscriber server (HSS).

Also, the Internet network (not illustrated) signifies a general open communication network, i.e., a public network, through which information is exchanged according to transmission control protocol/Internet protocol (TCP/IP). The Internet network (not illustrated) may be connected to the advertisement target application server 300 and the service device 400, may provide a service provided from the advertisement target application server 300 or the service device 400 to the user terminal device 100 via the core network (not illustrated) and the connection networks (not illustrated), and may provide an advertisement provided by the advertisement target application server 300 to the user terminal 100 via the same route. Also, the Internet network (not illustrated) may transmit various types of information transmitted from the user terminal device 100 to the advertisement target application server 300 or the service device 400 via the communication networks (not illustrated) and the core network (not illustrated).

The wireless communication device 600 according to an embodiment of the present invention is installed in any area and serves to transmit and receive a wireless signal to and from the user terminal device. Here, the wireless communication device 600 may broadcast a wireless signal including identification information (a unique ID) to the mobile communication terminal device.

A wireless signal according to an embodiment of the present invention broadcasted by the wireless communication device 600 may be a signal periodically transmitted from a beacon device or a signal designed to be transmitted and received to and from a wireless access point (AP) device. Each of the signals may include device identification information as described above.

The wireless communication device 600 may be one of a router, a repeater, a switch, and a bridge, and may be any device capable of implementing short-range communication such as a wireless LAN, an ultra-wideband (UWB), radio frequency, infrared data association (IrDA), Zigbee, and Bluetooth.

The overall system for performing an advertisement providing method according to an embodiment of the present invention has been briefly described above.

Figure 2:
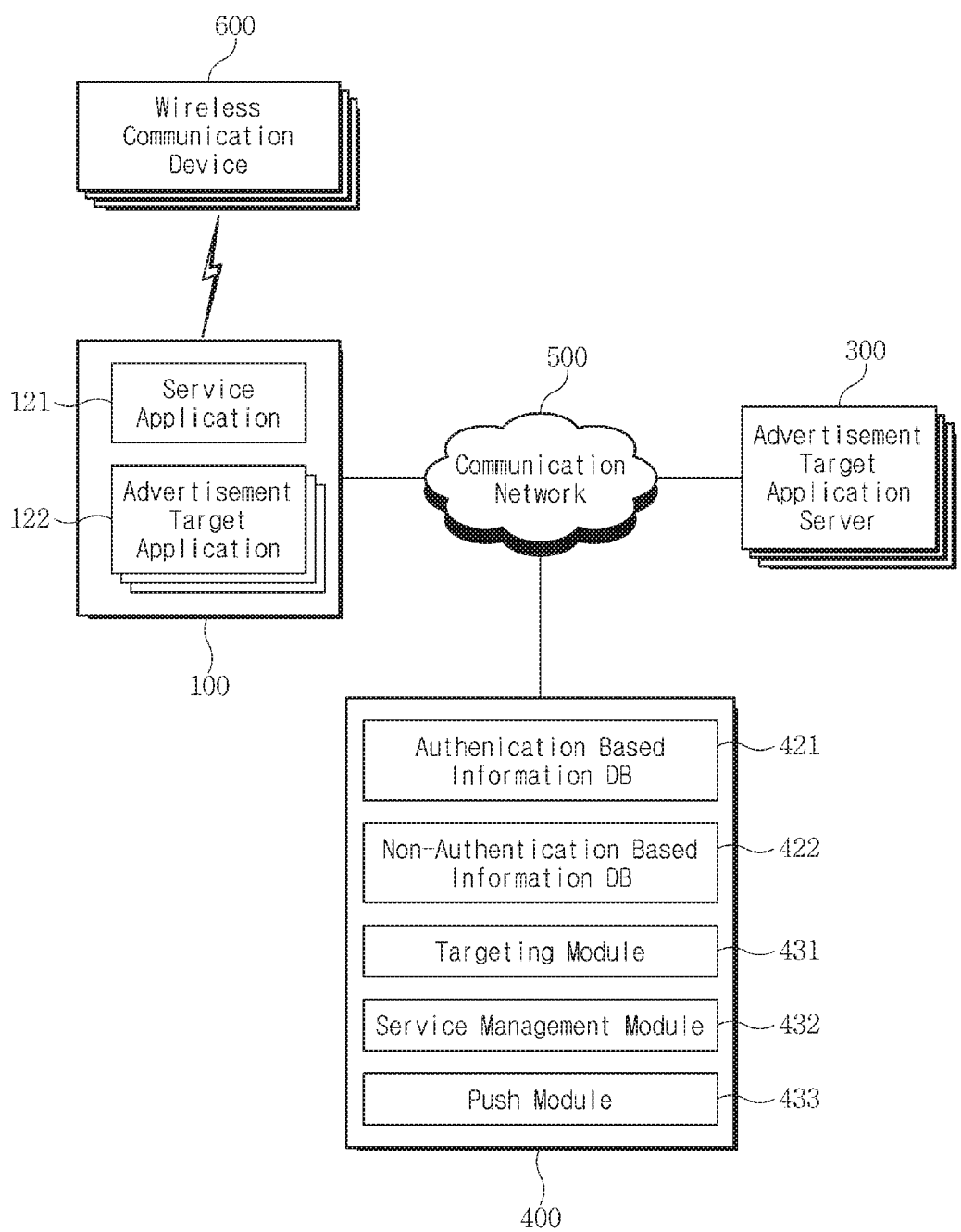
FIG. 2 is a block diagram illustrating the overall system for performing the advertisement providing method according to the embodiment of the present invention in more detail.

FIG. 2 is a block diagram illustrating the overall system for performing the advertisement providing method according to the embodiment of the present invention in more detail.

Referring to FIG. 2, a service application 121 and an advertisement target application 122 may be installed in the user terminal device 100, and the service device 400) may include an authentication based information database 421, a non-authentication based information database 422, a targeting module 431, and a service management module 432.

The service application 121 installed in the user terminal device 100 is an application linked to the service device 400 to provide the customer-targeted service as described above. For example, the service application 121 may be a mobile wallet application managed by the service device 400.

The service application 121 according to an embodiment of the present invention may check whether the advertisement target application 122 is installed in the user terminal device 100 when a request to collect non-authentication based information is received from the service device 400.

When the advertisement target application 122 is confirmed as being installed in the user terminal device 100, the service application 121 extracts non-authentication based information from the user terminal device 100 and transmits the non-authentication based information to the service device 400.

The service application 121 according to another embodiment of the present invention may receive advertisement condition information from the service device 400 and store the advertisement condition information. When the service application 121 receives a message that requests that whether current advertisement condition information is satisfied be checked from the advertisement target application 122, the service application 121 may check whether the advertisement condition information is satisfied.

Here, the advertisement condition information may contain information on one or more of a location, a date, a day, and time. Here, the information on a location may be identification information of the wireless communication device 600 installed at a location to which an advertisement is to be provided from the service device 400 instead of accurate location coordinates displaying latitude, longitude, and the like. The identification information may be an IP address or a media access control (MAC) address of a wireless AP device, a universally unique identifier (UUID) or subsystem identification (SSID) of a beacon device, or other unique values by which the wireless communication device is identifiable.

The service application 121 may check pre-stored identification information of the wireless communication device 600 and identification information of a currently connected wireless communication device 600 to check whether location information among pieces of the advertisement condition information is satisfied.

When information on one of a date, a day, and time is stored in the wireless communication device 600, the user terminal device 100 may use the stored information. The user terminal device 100 may also use information on one of a date, a day, and time stored in itself.

In another embodiment of the present invention, the location information and time information may be combined, and the advertisement condition information may be set as being satisfied when the user terminal device 100 is connected to the wireless connection device 600 at a specific location for a predetermined amount of time or longer.

When, as a result of the checking by the service application 121, the advertisement condition information is satisfied, the service application 121 may extract non-authentication based information from the user terminal device 100 and transmit the extracted non-authentication based information to the service device or the advertisement target application 122.

Aside from the above, the service application 121 may transmit authentication based information collected during service provision to the service device 400.

The advertisement target application 122 is any application that performs advertisement provision according to an embodiment of the present invention as described above. For example, the advertisement target application 122 may be an application related to a service provided in a department store or a discount store.

One or more advertisement target applications 122 may be present in the user terminal device 100.

The authentication based information database 421 included in the service device 400 is a configuration for storing authentication based information collected by customer-targeted service provision by the service device 400, and the non-authentication based information database 422 is a configuration for storing non-authentication based information collected by the service device 400 separately from a process of performing a customer-targeted service provided by the service device 400 of the present invention.

The targeting module 431, the service management module 432, and a push module 433 are configurations for controlling the service device 400 to provide an advertisement to the user terminal device 100 according to an embodiment of the present invention.

The targeting module 431 is a configuration that is connected to the authentication based information database 421 to extract a list of customers to be targeted based on authentication based information. Targeting may be performed on the basis of authentication based information.

In addition, the targeting module 431 according to another embodiment of the present invention may set advertisement condition information to be transmitted to the service application 121 in the targeted user terminal device 100, and may transmit the set advertisement condition information to the service management module 432.

The service management module 432 may request and collect non-authentication based information based on the list of customers extracted by the targeting module 431.

The service management module 432 according to an embodiment of the present invention may directly request non-authentication based information from the user terminal device 100 or generate a control message, which enables the push module 433 to transmit a push message to the user terminal device 100 and collect the non-authentication based information therefrom, and deliver the control message to the push module 433.

The control message may contain one or more of identification information of the service application 121, advertisement target application information, a time at which a request to send a push message is made, a phrase and an image related to sending the push, and a push ID.

In addition, the service management module 432 may check whether a user terminal device corresponding to each of the extracted list of customers is a user terminal device capable of receiving a push message.

The service management module 432 may transmit the advertisement condition information to the service application 121 in the targeted user terminal device 100 on the basis of the list of targeted customers received from the targeting module 431 according to another embodiment of the present invention.

The push module 433 according to an embodiment of the present invention may receive a message from the service management module 432 and be controlled so that a push message is sent to the user terminal device 100, and may send the push message to the user terminal device 100 at a sending request time included in the message.

The push message may request that the service application 121 of the user terminal device 100 operate, and the service application 121 may collect non-authentication based information without displaying the received push message on a notification bar. Alternatively, the service application 121 may display a push phrase on the notification bar after the push message is received and collect the non-authentication based information or may set non-authentication based information to be collected only when a specific input is made by a user, e.g., the user clicking a push phrase displayed on the notification bar.

In addition, each of the modules may be physically disposed in a single server device or may be operated by being stored in separate server devices.

Figure 3:
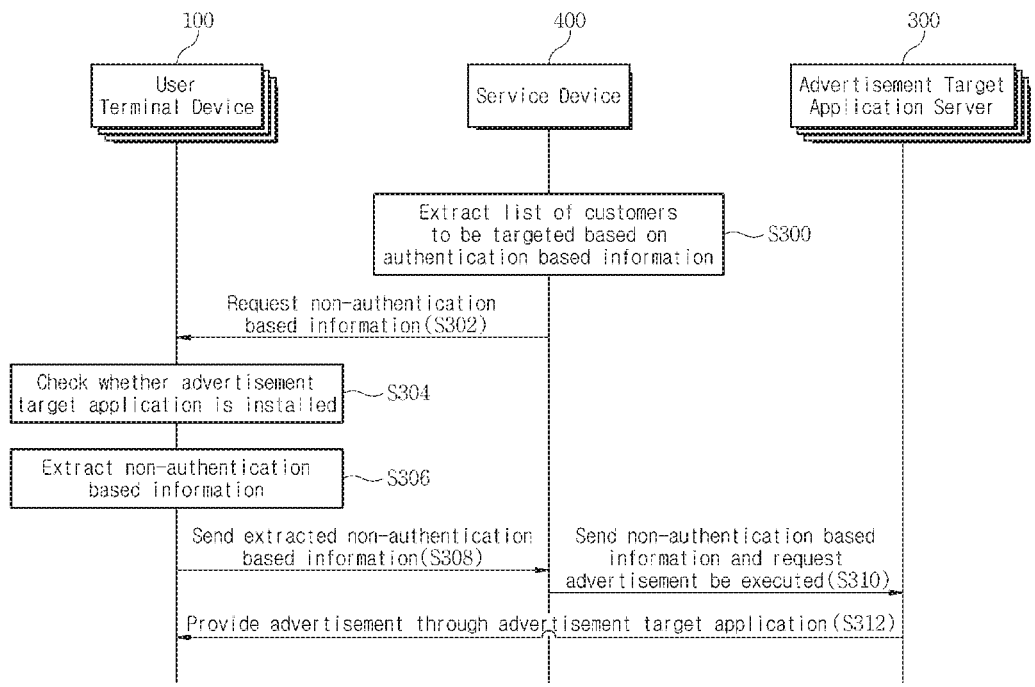
FIG. 3 is a message flow diagram illustrating an advertisement providing method according to an embodiment of the present invention.
Figure 4:
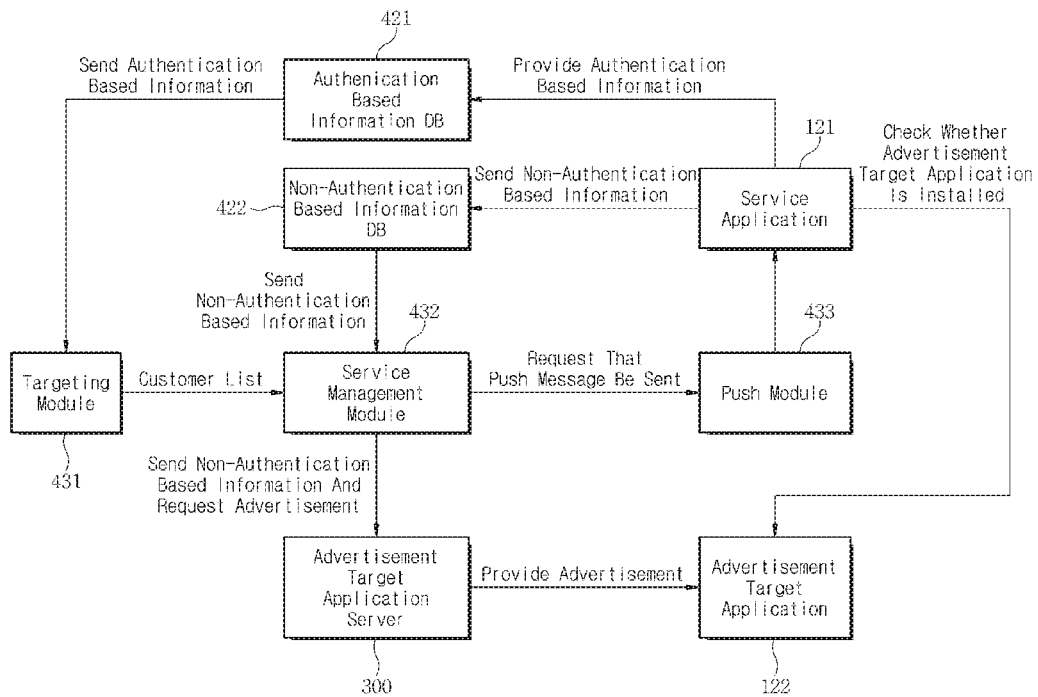
FIG. 4 is a block diagram illustrating a structure of a service device that performs an advertisement providing method according to an embodiment of the present invention.

FIG. 3 is a message flow diagram illustrating an advertisement providing method according to an embodiment of the present invention, and FIG. 4 is a view illustrating transmission and reception flows of a message described in FIG. 3 in such a way that the flows for each element may be understood.

According to an embodiment of the present invention, the targeting module 431 included in the service device 400 first extracts a list of customers to be targeted based on authentication based information (S300).

The extracted list of customers may be sent to the service management module 432 located in the service device 400, and the service management module 432 may request non-authentication based information from a user terminal device corresponding to each of the customers in the list of customers (S302). The non-authentication based information may contain advertisement-specific user identification information related to an OS installed in the user terminal device or communication module information of an advertisement target application.

In addition, the requesting of the non-authentication based information may be performed by sending a push message, which includes a message that requests the non-authentication based information, from the push module 433 to the user terminal device 100.

When the request for non-authentication based information is received from the service device 400, the user terminal device 100 runs the service application 121 to check whether the advertisement target application 122 is installed in the user terminal device 100 (S304). The advertisement target application 122 may be designated by a manager of the service device 400 according to an embodiment of the present invention, and information on the advertisement target application 122 whose installation will be checked when the request for non-authentication based information is made by the service device 400 may be sent together with the non-authentication based information. Alternatively, the information on the advertisement target application 122 may be pre-stored in the service application 121.

When the advertisement target application 122 is confirmed as being installed in Step S304, the service application 121 extracts the non-authentication based information from the user terminal device 100 (S306) and sends the non-authentication based information to the non-authentication based information database 422 in the service device 400 (S308).

The service management module 432 sends the non-authentication based information stored in the non-authentication based information database 422 to the advertisement target application server 300 and requests that an advertisement be executed (S310).

The advertisement target application server 300 enables the advertisement target application 122 installed in the user terminal device 100 to provide the advertisement (S312).

A message flow when an advertisement is provided from the system according to an embodiment of the present invention has been described above.

Figure 5:
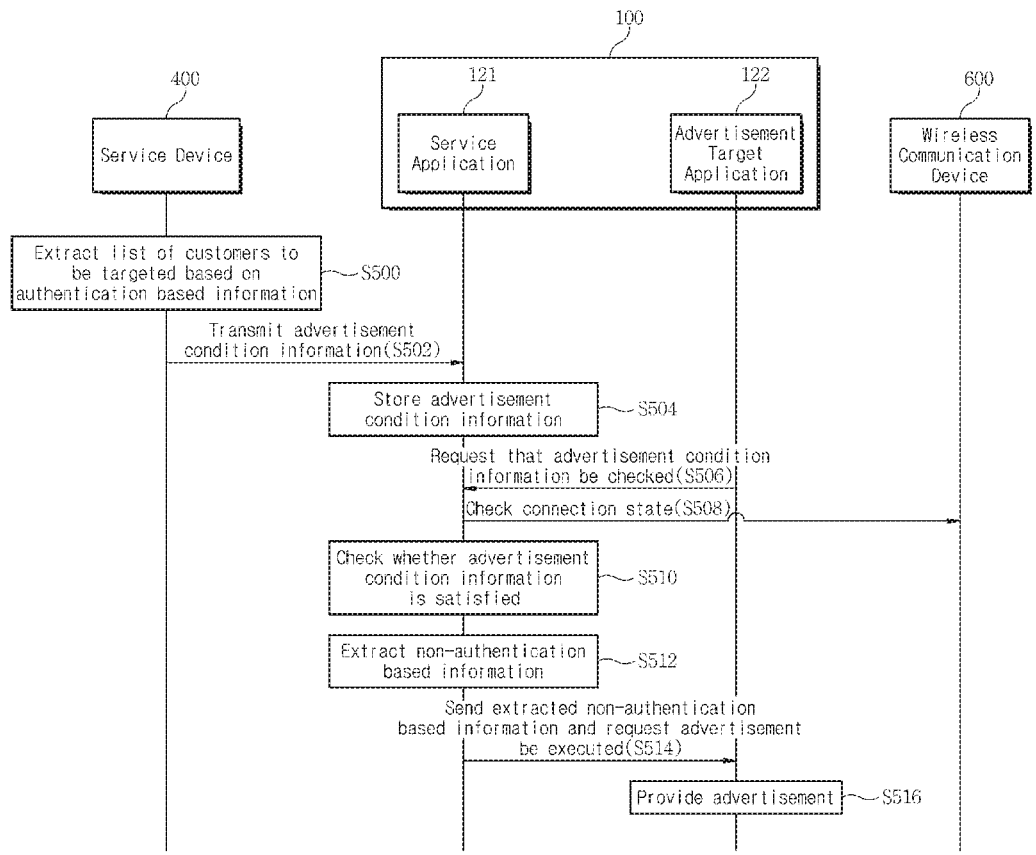
FIG. 5 is a message flow diagram illustrating an advertisement providing method according to another embodiment of the present invention.

FIG. 5 is a message flow diagram illustrating an advertisement providing method according to another embodiment of the present invention.

According to another embodiment of the present invention, the targeting module 431 included in the service device 400 first extracts a list of customers to be targeted based on authentication based information (S500).

The extracted list of customers is sent to the service management module 432 located in the service module 400, and the service management module 432 transmits advertisement condition information to the service application 121 in the user terminal device 100 corresponding to the list of customers (S502).

As described above, the advertisement condition information may include information on one or more of a location, a date, a day, and time at which an advertisement will be provided. Location information may be identification information of a wireless communication device installed at a location at which the advertisement is to be provided instead of coordinate information.

The service application 121 stores the received advertisement condition information (S504). The advertisement condition information may be transmitted from the service device 400 to the service application 121 every predetermined period and stored in the service application 121.

While the advertisement condition information is stored in the service application 121, the advertisement target application 122 installed in the user terminal device 100, which is the same as that in which the service application 121 is installed, requests that the service application 121 check whether a current advertisement condition information is satisfied (S506).

When the request to check whether the advertisement condition information is satisfied is received from the advertisement target application 122, the service application 121 may check a connection state with the wireless communication device 600 (S508) and compare the stored advertisement condition information with current conditions.

Here, identification information of a currently connected wireless communication device 600 may be checked, and whether the checked identification information of the wireless communication device 600 corresponds to identification information of the wireless communication device 600 included in the advertisement condition information may be checked. When the pieces of information are confirmed to correspond to each other, location information among pieces of the advertisement condition information may be determined as being satisfied.

The advertisement condition information may be set by combining location information and information on one of a date, a day, and time. For example, an advertisement may be provided when a user of the user terminal device 100 visits a certain location on a specific date or day or stays at a certain location for a predetermined amount of time or longer.

In addition, different conditions may be set as advertisement condition information for each piece of advertisement content to be provided.

For example, a cosmetic product advertisement may be set to be provided when the user terminal device 100 stays on the first floor of a department store for a minute or longer, and an advertisement related to items on sale in a discount store may be set to be provided when the user terminal device 100 passes near the discount store.

That is, the advertisement condition information may include a plurality of conditions such as "stay on the first floor of a department store for a minute or longer" or "located within a predetermined distance from a discount store," and different advertisement content may be provided according to whether each of the conditions is satisfied.

Also, the advertisement condition information may be set to provide an advertisement when the user of the user terminal device 100 stays in a specific location within a predetermined amount of time. For example, the advertisement condition information may be set so that advertisement content related to a food court is provided when an amount of time for which the user stays at the food court is within thirty minutes and the advertisement content is not provided when the amount of time exceeds thirty minutes.

Further, the advertisement condition information may include information on the advertisement target application 122, and different advertisement content may be provided depending on a type of the advertisement target application 122 that requested an advertisement.

As described above, the service application 121 checks whether advertisement condition information is satisfied (S510) and, when the advertisement condition information is satisfied, extracts non-authentication based information from the user terminal device 100 (S512).

The non-authentication based information may include one or more of app activity information by operation of the service application, advertisement-specific user identification information related to an OS installed in the user terminal device, and communication module information of an advertisement target application.

The service application 121 may notify the service device 400 of the fact that the advertisement target application 122 has requested that the advertisement condition information be checked.

The service application 121 sends the extracted non-authentication based information, the fact that the advertisement condition information is satisfied, and an advertisement execution request to the advertisement target application (S514).

The advertisement target application 122 receives the non-authentication based information and the advertisement execution request from the service application 121 and provides an advertisement to the user (S516).

Here, advertisement content may be requested from the service device 400 or the advertisement target application server 300. Alternatively, the advertisement content may also be pre-stored in the advertisement target application 122.

A message flow when an advertisement is provided from the system according to another embodiment of the present invention has been described above.

Next, each of the devices and operations thereof for performing the advertisement providing method according to an embodiment of the present invention will be described.

First, a structure and operation of the service device 400 according to an embodiment of the present invention will be described.

Figure 6:
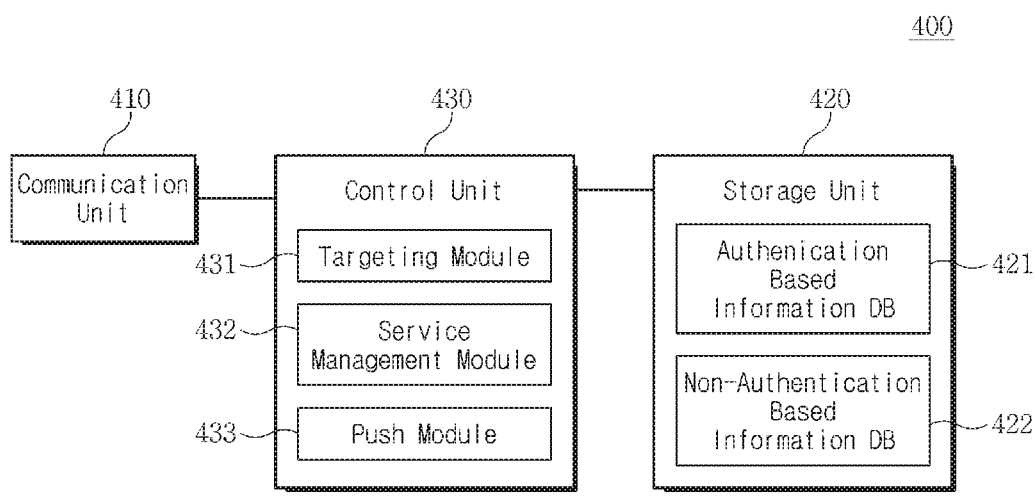
FIG. 6 is a block diagram illustrating a structure of a service device 400 that performs an advertisement providing method according to an embodiment of the present invention.

FIG. 6 is a block diagram illustrating a structure of the service device 400 that performs an advertisement providing method according to an embodiment of the present invention.

Referring to FIG. 6, the service device 400 according to an embodiment may include a communication unit 410, a storage unit 420, and a control unit 430.

Among the above elements, the communication unit 410 is a means for receiving data from an external source and transmitting data to the external source, and is connected to the user terminal device 100 or the advertisement target application server 300 via the communication network 500 to perform communication.

The communication unit 410 according to an embodiment of the present invention may be connected to the user terminal device 100 and transmit a message requesting non-authentication based information or receive authentication based information and non-authentication based information. The received information is stored in the storage unit 420. Also, the communication unit 410 may send non-authentication based information and an advertisement execution request to the advertisement target application server 300.

The communication unit 410 according to another embodiment of the present invention may be connected to the user terminal device 100 and transmit and receive authentication based information and non-authentication based information. Also, the communication unit 410 may receive the fact that a request that advertisement condition information be checked has been generated from the advertisement target application. The received information is stored in the storage unit 420. Also, the communication unit 410 may transmit advertisement condition information to the service application 121 of the targeted user terminal device 100 or transmit advertisement content to the advertisement target application 122 or the advertisement target application server 300.

The storage unit 420 may store a program for performing an advertisement providing method according to an embodiment of the present invention. Also, the storage unit 420 may include the authentication based information database 421 and have authentication based information pre-stored therein or store authentication based information newly collected from the user terminal device 100. Also, the storage unit 420 may include the non-authentication based information database 422 and store non-authentication based information collected from the user terminal device 100. The service device 400 may further include a database management system configured to manage the databases.

In addition, the storage unit 420 may store information on the advertisement target application 122 set to provide an advertisement according to an embodiment of the present invention, and may store a list of customers extracted using authentication based information.

Also, according to another embodiment of the present invention, the storage unit 420 may further store advertisement condition information and advertisement content.

The control unit 430 is a configuration for controlling the service device 400 to perform the advertisement providing method, and may be implemented by being supported by one or more processors.

Further, the control unit 430 may be operated by processing a command stored in the storage unit 420 through the one or more processors. Here, the command may include a command or an executable code to be interpreted, such as a script command including JavaScript or ECMAScript command, or other commands stored in a computer readable medium.

Particularly, the control unit 430 according to an embodiment of the present invention may include the targeting module 431, the service management module 432, and the push module 433, and the control unit 430 according to another embodiment of the present invention may include the targeting module 431 and the service management module 432.

The targeting module 431 extracts a list of customers to be targeted using authentication based information stored in the authentication based information database 421, wherein the customers are targets of advertisement provision. The list of customers may be extracted using personal information included in the authentication based information.

The targeting module 431 sends the extracted list of customers to the service management module 432, and the service management module 432 checks validity of the received list of customers. Here, checking validity refers to checking whether it is possible to request non-authentication based information from the user terminal device 100 corresponding to the list of customers.

For example, checking validity may be performed by checking whether a push message can be sent to the user terminal device 100 corresponding each of the customers in the list of customers to be targeted according to an embodiment of the present invention. Because the service application 121 has to be installed in the user terminal device 100 so that a push message may be transmitted thereto, validity of the list of customers may also be checked by checking whether the service application 121 is installed.

When validity of the list of customers is confirmed, the service management module 432 according to an embodiment of the present invention requests that non-authentication based information be collected from the user terminal device 100 of a customer included in the list of customers.

The collecting the non-authentication based information may be performed by sending a push message from the push module 433. For this, the service management module 432 may deliver a control message that requests that a push be sent to the push module 433. The control message may contain one or more of identification information of the service application 121, information on the advertisement target application 122, a time at which a push message will be sent, a phrase and an image of the push message, and a push ID of the user terminal device 100 that will receive the push message.

The push module 433 sends the push message to the service application 121 of the user terminal device 100 according to the control message received from the service management module 432.

When the non-authentication based information is received from the service application 121 in the user terminal device 100, the service management module 432 may control the communication unit 410, send the non-authentication based information to the advertisement target application server 300, and request that an advertisement be executed at the same time.

When the validity of the list of customers is confirmed, the service management module 432 according to another embodiment of the present invention may transmit advertisement condition information to the user terminal device 100 of a customer included in the list of customers. Also, when the non-authentication based information is received from the service application 121 or the advertisement target application 122 in the user terminal device 100, the service management module 432 may control the communication unit 410 and transmit advertisement content to the advertisement target application 122 or the advertisement target application server 300.

Although not illustrated in the drawings, the service device 400 according to an embodiment of the present invention may further include an input device and an output device used in a typical computing device.

Figure 7:
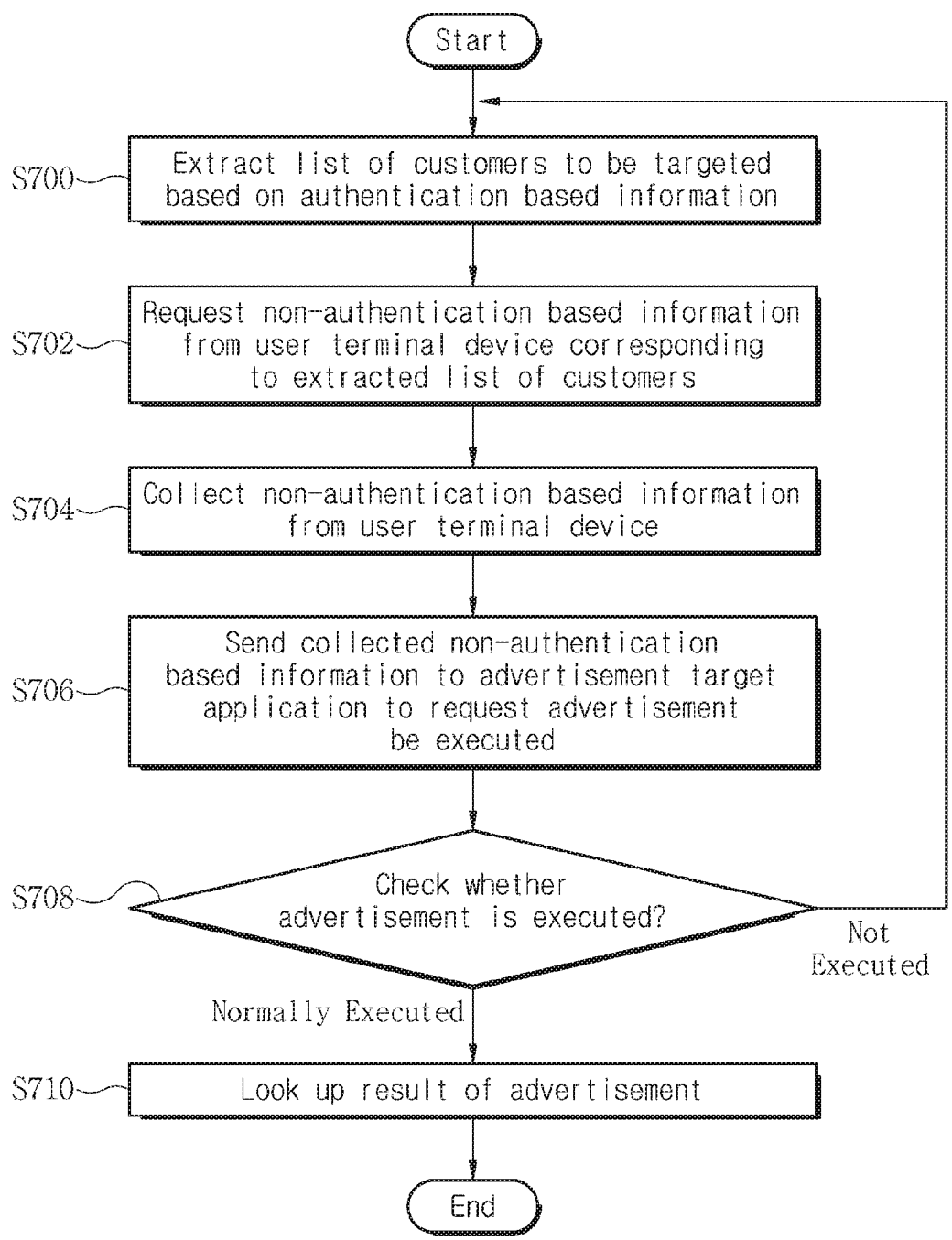
FIG. 7 is a flowchart illustrating an operation of the service device 400 according to an embodiment of the present invention.

FIG. 7 is a flowchart illustrating an operation of the service device 400 according to an embodiment of the present invention.

Referring to FIG. 7, first, the service device 400 extracts a list of customers to be targeted based on authentication based information (S700). The authentication based information may be pre-stored in the authentication based information database 421 of the service device 400, and may also be collected through the service application 121 in the user terminal device 100. That is, by Step S700, a customer list in which pieces of information related to already authenticated users and the user terminal device 100 of each of the users are gathered may be extracted first in a process of service provision by the service device 400 of the present invention.

After Step S700, the service device 400 requests non-authentication based information from the user terminal device corresponding each of the customers in the list of customers extracted in Step S700 (S702). Here, the requesting of the non-authentication based information may be performed by sending a push message to the service application 121 in the user terminal device 100.

In this way, the non-authentication based information may be collected from customers in the list of customers extracted from the authenticated customers.

When the service device 400 collects the non-authentication based information from the user terminal device 100 after the above request (S704), the service device 400 sends the collected non-authentication based information to the advertisement target application server 300 and requests that an advertisement be executed (S706). Here, the non-authentication based information is non-authentication information of the customers. Because the non-authentication based information is not directly mapped with personal information of users, user exposure can be minimized.

After requesting that an advertisement be executed, the service device 400 may check whether the advertisement has been executed through the advertisement target application server 300 (S708). When the advertisement is normally executed, the service device 400 may look up a result of the execution of the advertisement (S710). When the advertisement is not executed, the service device 400 may repeat the above steps to modify information for providing the advertisement.

The operational process of the service device 400 according to an embodiment of the present invention has been described above through a flowchart.

Figure 8:
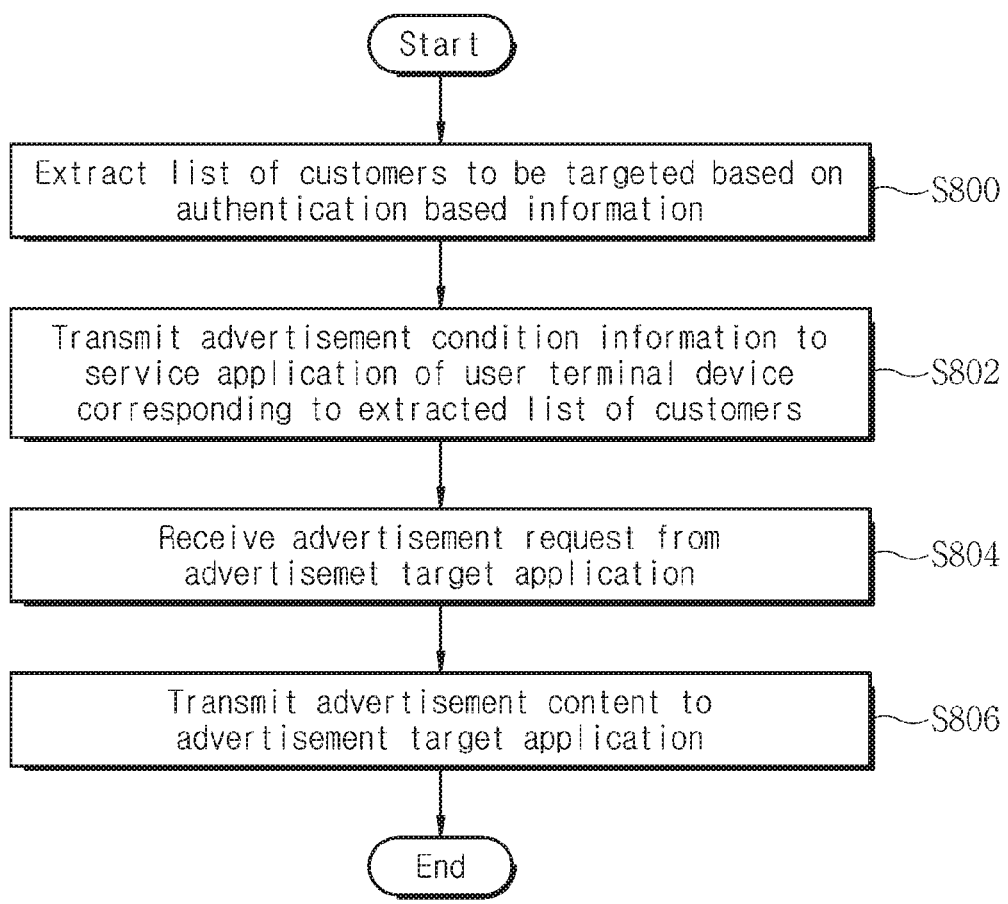
FIG. 8 is a flowchart illustrating an operation of the service device 400 according to another embodiment of the present invention.

FIG. 8 is a flowchart illustrating an operation of the service device 400 according to another embodiment of the present invention.

Referring to FIG. 8, first, the service device 400 extracts a list of customers to be targeted based on authentication based information (S800). The authentication based information may be pre-stored in the authentication based information database 421 of the service device 400, and may be collected through the service application 121 in the user terminal device 100. That is, by Step S800, a customer list in which pieces of information related to already authenticated users and the user terminal device 100 of each of the users are gathered may be extracted first in a process of service provision by the service device 400 of the present invention.

After Step S800, the service device 400 transmits advertisement condition information to the service application 121 in the user terminal device 100 corresponding to the list of customers extracted in Step S800 (S802). The transmitted advertisement condition information is stored in the user terminal device 100 by the service application 121 and is used to check whether the advertisement condition information is satisfied when there is a request to check whether the advertisement condition information is satisfied from the advertisement target application 122.

When the advertisement target application 122 transmits non-authentication based information through a series of process in the user terminal device 100 and requests advertisement content (S804), the service device 400 receives and stores the non-authentication based information and transmits the advertisement content to the advertisement target application 122 or the advertisement target application server 300 (S806).

The operational process of the service device 400 according to another embodiment of the present invention has been described above through a flowchart.

Next, a structure and operation of the user terminal device 100 according to an embodiment of the present invention will be described.

Figure 9:
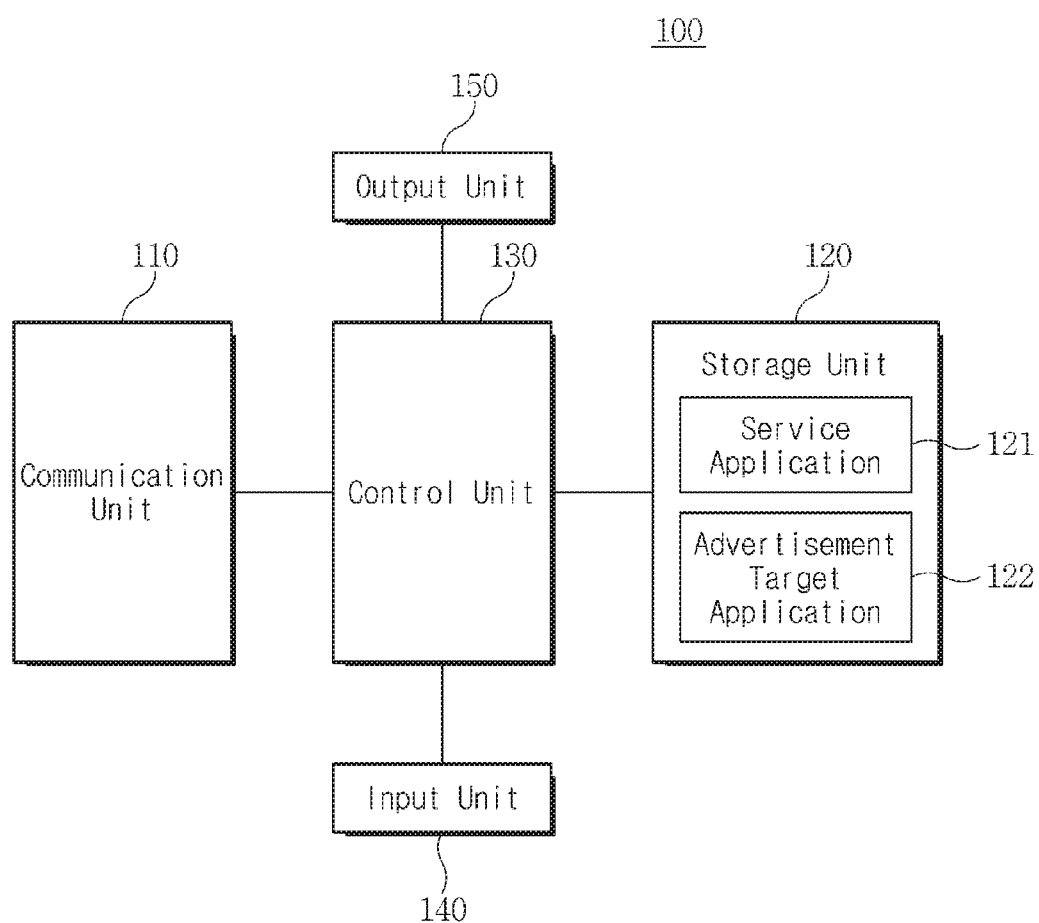
FIG. 9 is a block diagram illustrating a structure of a user terminal device 100 that performs an advertisement providing method according to an embodiment of the present invention.

FIG. 9 is a block diagram illustrating a structure of the user terminal device 100 that performs an advertisement providing method according to an embodiment of the present invention.

Referring to FIG. 9, the user terminal device 100 according to an embodiment of the present invention may include a communication unit 110, a storage unit 120, a control unit 130, an input unit 140, and an output unit 150.

The communication unit 110 is a means for receiving data from an external source and transmitting data to the external source. For example, the communication unit 110 may be represented as a logical combination of one or more software and/or hardware modules such as a network interface card and a corresponding network driver interface specification (NDIS) stack.

The communication unit 110 may support various communication protocols. For example, the communication unit 110 may support various mobile communication standards, such as advanced mobile phone service (AMPS), CDMA, GSM, W-CMDA, high speed downlink packet access (HSDPA), LTE, LTE-A, and short-range wireless network technology such as Bluetooth low energy (BLE) and ZigBee.

Particularly, in the present invention, the communication unit 110 may transmit and receive data to and from the advertisement target application server 300 or the service device 400 via the communication network 500 and include a mobile communication module for connecting to the communication network 500 according to a mobile communication standard and transmitting and receiving data. The transmitted and received data includes data related to service provision of an original function of an advertisement target application provided by the advertisement target application server 300 and data transmitted and received to and from the service device 400 according to an embodiment of the present invention.

The storage unit 120 is a configuration for storing data or a program executed or processed by the control unit 130. Basically, the storage unit 120 may store an OS for booting a mobile communication terminal device and operating each of the configurations described above and application programs for supporting various user functions, e.g., a user function for supporting a call function of the mobile communication terminal device, an MP3 user function for playing other sound sources, an image output function for reproducing an image such as a picture, a video playing function, etc.

Particularly, in the present invention, the storage unit 120 may store an application or a computer program for performing the advertisement providing method according to the present invention. The service application 121 and the advertisement target application 122 may be installed in the storage unit 120 as the application or the computer program.

The control unit 130 is a configuration for performing overall control of the mobile communication terminal device, and may be operated by processing a command stored in the storage unit 120 through one or more processors. Here, the command may include a command or an executable code to be interpreted, such as a script command including JavaScript or ECMAScript command, or other commands stored in a computer readable medium.

The control unit 130 according to an embodiment of the present invention may extract non-authentication based information according to an operation of the service application 121 stored in the storage unit 120, and may control the communication unit 110 to send the extracted non-authentication based information to the service device 400.

Here, a command for extracting non-authentication based information may be received from the service device 400 in the form of a push message for the service application 121. The service application 121 may be set so that the received push message is not displayed on a notification bar, and the non-authentication based information is collected without the user recognizing the collecting. Conversely, the service application 121 may be set so that a phrase related to the push message is displayed on the notification bar after receiving the push message, and the non-authentication based information is collected. The non-authentication based information may be set to be collected only when a specific input for agreeing to information collection is made by a user, e.g., the user clicking a push phrase displayed on the notification bar.

The control unit 130 according to another embodiment of the present invention may send a message requesting that advertisement condition information be checked to the service application 121 according to an operation of the advertisement target application 122 stored in the storage unit 120, may check the advertisement condition information according to an operation of the service application 121, may extract the non-authentication based information, and may control the communication unit 110 to send the extracted non-authentication based information to the service device 400.

In the present invention, the control unit 130 may check whether the advertisement target application 122 is installed in the user terminal device 100, may receive an advertisement from the service device 400 or the advertisement target application server 300 while the advertisement target application 122 is used, and may enable the received advertisement to be displayed on the output unit 150.

That is, the control unit 130 operates according to service logic of an application or a computer program stored in the storage unit 120 and performs the advertisement providing method according to the present invention.

The input unit 140 is a configuration for receiving a command and information from an advertiser. The input unit 140 generates a predetermined input signal according to a manipulation of the advertiser and delivers the input signal to the control unit 130.

The input unit 140 may be implemented using various input means that are currently commercialized or may be commercialized in the future. For example, the input unit 140 may include typical input devices such as a keyboard, a mouse, a joystick, a touchscreen, and a touch pad as well as a gesture input means configured to sense motion of an advertiser and generate a specific input signal, and a voice recognition means configured to recognize voice of an advertiser.

Further, the input unit 140 may be connected to the control unit 130 via a system bus and an input/output interface.

Here, the input/output interface may be logically represented by any of a wide variety of different interfaces such as a serial port interface, a personal system (PS)/2 interface, a parallel port interface, a universal serial bus (USB) interface, and an institute of electrical and electronics engineers (IEEE) 1394 interface (i.e., a FireWire interface), or may be logically represented by a combination of different interfaces.

The output unit 150 is a configuration provided to enable an advertiser to recognize a result or a state of operation of the user terminal device 100. Particularly, the output unit 150 may use a display means to visually output information.

For example, the output unit 150 may be implemented using various two-dimensional display means such as an electroluminescent display (ELD), a vacuum fluorescent display (VFD), a liquid crystal display (LCD), a light emitting diode (LED) display, a plasma display panel (PDP), and an organic LED (OLED) display as well as a three-dimensional display means such as holography and laser beams. The output unit 150 may be connected to the control unit 130 through a video interface such as high definition multimedia interface (HDMI) and a graphics device interface (GDI), and the control unit 130 may be connected to the video interface via a system bus.

Particularly, in the present invention, the output unit 150 may be used to display an advertisement received from the advertisement target application server 300.

Figure 10:
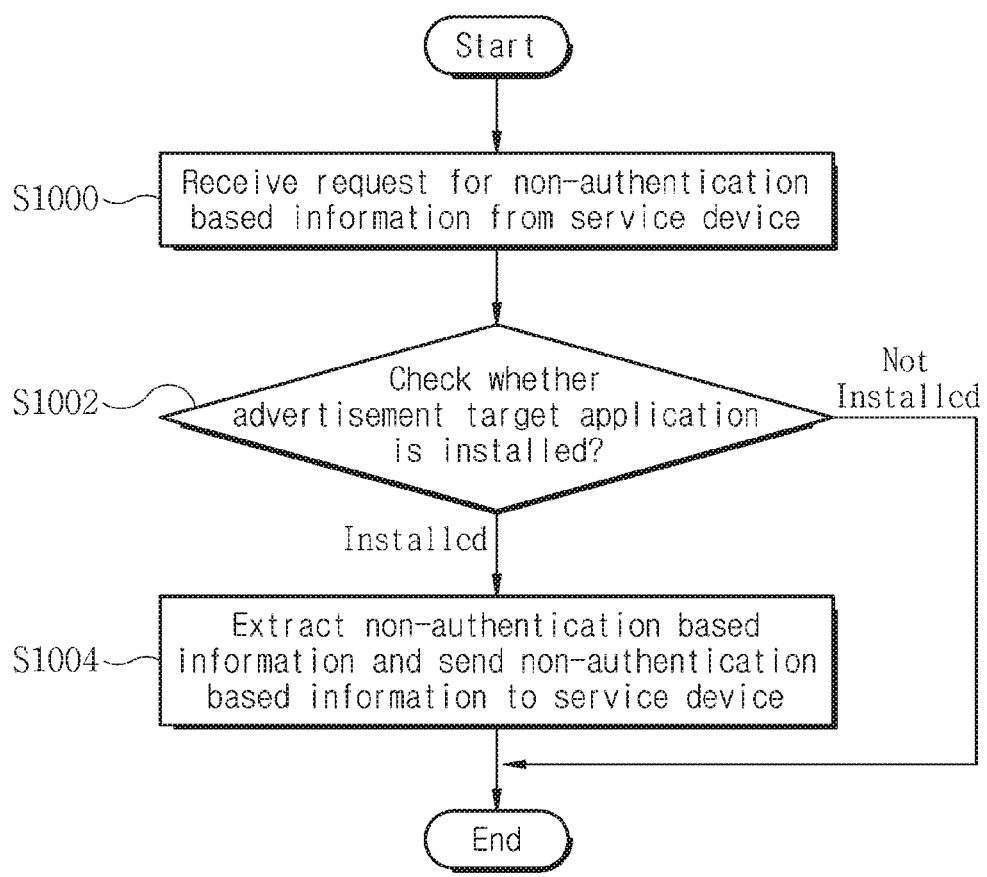
FIG. 10 is a flowchart illustrating an operation of the user terminal device 100 according to an embodiment of the present invention.

FIG. 10 is a flowchart illustrating an operation of the user terminal device 100 according to an embodiment of the present invention.

Referring to FIG. 10, first, the user terminal device 100 receives a request for non-authentication based information from the service device 400 (S1000). As described above, the request for non-authentication based information may be in the form of a push message for the service application 121 installed in the user terminal device 100.

The push message may not be displayed on a notification bar to prevent a user from recognizing that the non-authentication based information is being collected. Alternatively, whether the request for non-authentication based information is received may be displayed on the notification bar to enable the user to recognize that the non-authentication based information is being collected. Also, the user may check the push message displayed on the notification bar, and each of the processes below may be performed after a predetermined input is made by the user. Here, the predetermined input may be clicking the push message.

The user terminal device 100 that has received the request for non-authentication based information checks whether the advertisement target application 122 is installed in the user terminal device 100 by operating the service application 121 (S1002). One or more advertisement target applications 122 may be present in the terminal device 100, and the advertisement target applications 122 is freely set according to a policy of an operator who uses the service device 400 to provide a customer-targeted service. Information on the advertisement target application 122 may be included in the request for non-authentication based information, and information on the designated advertisement target application 122 may be pre-stored in the service application 121.

When the advertisement target application 122 is confirmed as not being installed as a result of Step S1002, the service device 400 is notified of the fact that the advertisement target application 122 is not installed and the process is ended. When the advertisement target application 122 is installed, the service application 121 extracts non-authentication based information and sends the extracted non-authentication based information to the service device 400 (S1004).

Figure 11:
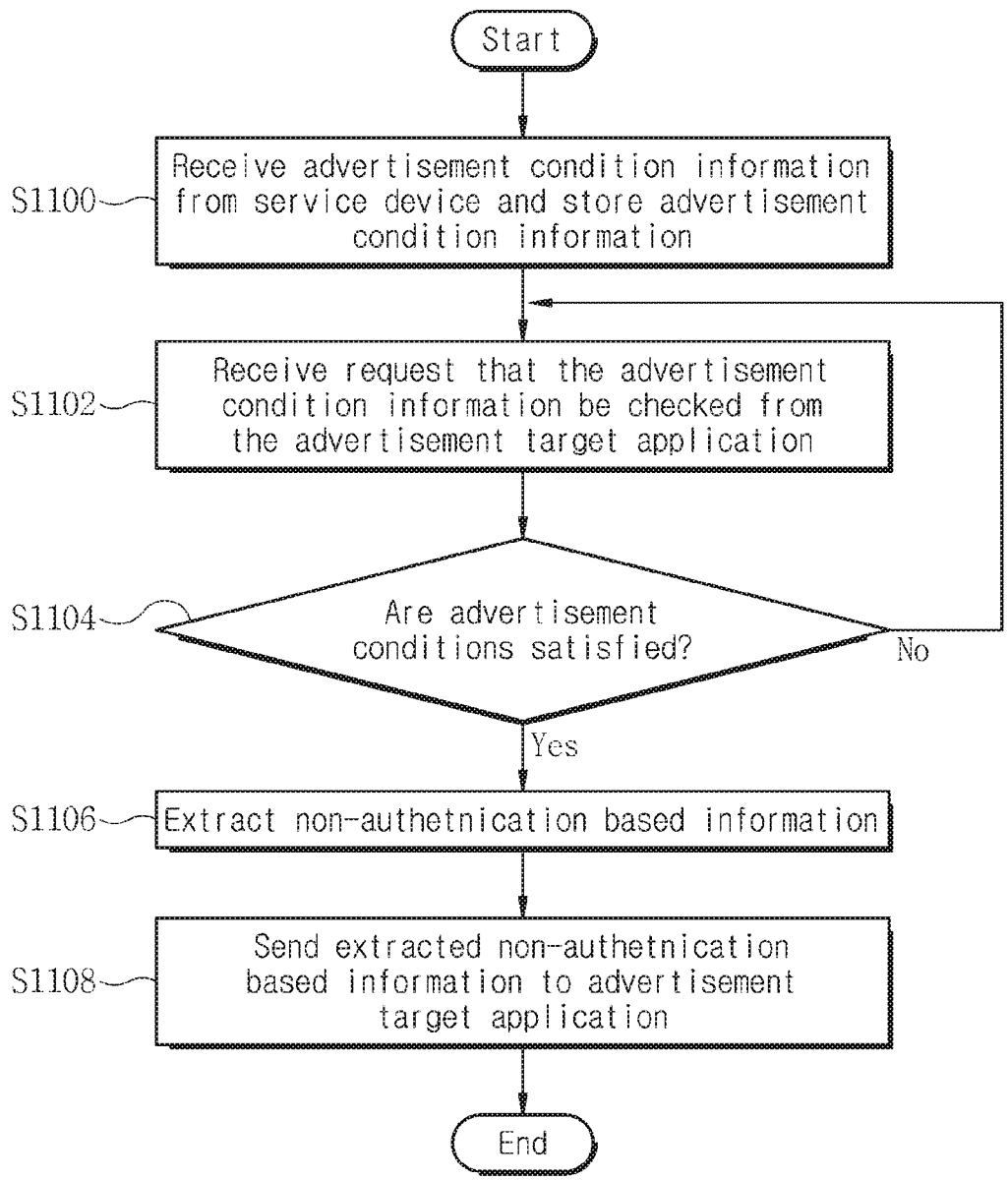
FIG. 11 is a flowchart illustrating an operation of a service application 121 in the user terminal device 100 according to another embodiment of the present invention.

FIG. 11 is a flowchart illustrating an operation of the service application 121 in the user terminal device 100 according to another embodiment of the present invention.

Referring to FIG. 11, first, the service application 121 in the user terminal device 100 receives and stores advertisement condition information from the service device 400 (S1100).

Then, the service application 121 receives a request that the advertisement condition information be checked from the advertisement target application 122 (S1102).

According to the request from the advertisement target application 122, the service application 121 check whether the advertisement condition information is satisfied (S1104). Whether the advertisement condition information is satisfied may be checked by checking a connection state with the wireless communication device 600 and querying the connected wireless communication device 600 for information required for checking whether the advertisement condition information is satisfied.

The service application 121 that has checked whether the advertisement condition information is satisfied extracts non-authentication based information from the user terminal device 100 when the advertisement condition information is satisfied (S1106).

The extracted non-authentication based information and the fact that a request that the advertisement condition information be checked has been made by the advertisement target application may be sent to the service device 400.

The service application 121 sends the extracted non-authentication based information to the advertisement target application 122 (SI 108).

One or more advertisement target applications 122 may be present in the terminal device 100, and the advertisement target applications 122 is freely set according to a policy of an operator who uses the service device 400 to provide a customer-targeted service. Information on the advertisement target applications 122 may be included in the advertisement condition information sent from the service device 400, and information on a designated advertisement target application 122 may be pre-stored in the service application 121.

When the advertisement condition information is confirmed as not being satisfied as a result of Step S1104, the advertisement target application 122 is notified of the fact that the advertisement condition information is not satisfied and the process is ended.

The structure and operation of the user terminal device 100 according to the present invention have been described above.

The present invention includes a program for performing an advertisement providing method. Here, a program recorded in a recording medium may be read, installed, and executed in a computer to execute the functions described above.

Here, the program mentioned above may include a code that is coded using a computer language such as C, C++, Java, and a machine language that may be read through a device interface of the computer by a central processing unit (CPU) of the computer for the computer to read the program recorded in the recording medium and execute the functions implemented by the program.

That is, the code includes languages such as a data oriented language such as structured query language (SQL) and dBase, a system language such as C, Objective C, C++, and Assembly, an architecture language such as Java and .NET, and an application language such as hypertext preprocessor (PHP), Ruby, Perl, and Python, but is not limited thereto, and may include any language well-known to one of ordinary skill in the art to which the present invention pertains.

The code may include a function code related to a function in which the functions described above are defined, and may include a control code related to an execution process required for a processor of the computer to execute the functions described above in a predetermined order.

Also, the code may further include addition information required for a processor of the computer to execute the functions described above or a memory reference related code about a location (an address) in a memory inside or outside the computer where a medium has to reference.

Also, when a processor of the computer requires communication with another computer or server at a remote place to execute the functions described above, the code may further include a communication related code regarding how the processor of the computer should communicate with the other computer or server at the remote place using a communication module of the computer and which information or medium should be transmitted and received during the communication.

A computer readable medium suitable for storing a computer program instruction and data, e.g., a recording medium includes, for example, magnetic media such as a hard disk, a floppy disk, and a magnetic tape, optical media such as a compact disk read-only memory (CD-ROM) and a digital video disk (DVD), magneto-optical media such as a floptical disk, and semiconductor memories such as a ROM, a random access memory (RAM), a flash memory, an erasable programmable ROM (EPROM), and an electrically erasable programmable ROM (EEPROM). A processor and a memory may be supplemented by a logical circuit or integrated therewith.

Also, the computer readable recording medium may be distributed throughout a computer system connected to a network, and a code that is readable by a computer in a distributed way may be stored and executed in the computer readable recording medium.

Also, a functional program for realizing the present invention and codes and code segments related thereto may be easily inferred or changed by programmers of ordinary skill in the art to which the present invention pertains in consideration of a system environment of a computer that reads a recording medium and executes the program.

Each of the steps according to embodiments of the present invention may be implemented with computer executable commands and executed by a computing system. Here, "computing system" is defined as one or more software modules, one or more hardware modules, or combinations thereof that operate together with operations on electronic data.

For example, a definition of a computer system includes a software module such as an OS of a PC and a hardware component of the PC. A physical layout of a module is not important. The computer system may include one or more computers connected through a network.

Likewise, in a computing system, an inner module such as a memory and a processor may be implemented with a single physical device that operates together with operation on electronic data.

Also, an implementation for executing technical features described herein may include a backend component such as a data server or a middle-way component such as an application server.

For example, the implementation may be implemented in a computing system that includes a frontend component such as a client computer having a web browser or a graphic user interface through which a user may interact with the implementation described herein, or any combination of one or more of backend, middle-way, and frontend components. Components of a system may be connected to each other by a certain form or medium of digital data communication such as a communication network.

That is, a device for performing the advertisement providing method according to the present invention may be implemented to perform the embodiments described above based on a computing system that will be described below.

FIG. 12 is a view illustrating an operating environment of a device for performing an advertisement providing method according to an embodiment of the present invention. That is, FIG. 12 is a view for describing an operating environment of the user terminal device 100 and/or the service device 400.

FIG. 12 and the description below are intended to provide simple and general description of a suitable computing environment in which the present invention may be implemented. Although not a requirement, the functions of the user terminal device 100 and/or the service device 400 according to the present invention may be described in relation to a computer executable command such as a program module executed by a computer system.

Generally, a program module includes a routine, a program, an object, a component, a data structure, and the like that perform a specific task or implement a specific abstract data type. A computer executable command, a data structure related thereto, and a program module represent examples of a program coding means that executes actions of the present invention disclosed herein.

Referring to FIG. 12, a computing system that may be applied to the user terminal device 100 and the service device 400 according to the present invention includes a computing device that is in a form which includes a processing unit 11, a system memory 12, and a system bus 10 configured to connect various system components including the system memory 12 to the processing unit 11.

The processing unit 11 may execute a computer executable command designed to implement a feature of the present invention.

The system bus 10 may be any one of several types of bus structures including a local bus, a peripheral bus, a memory bus, and a memory controller that use any of various bus architectures.

The system memory 12 includes a ROM 12a and a RAM 12b. A basic input/output system (BIOS) 13a that includes a basic routine assisting in transmission of information between elements within the computing system at a certain time, such as during operation, may be generally stored in the ROM 12a.

The computing system may include a storage means, e.g., a hard disk drive 15 configured to read out information from a hard disk or record information to the hard disk, a magnetic disk drive 16 configured to read out information from a magnetic disk or record information to the magnetic disk, and an optical disk drive 17 configured to read out information from an optical disk, such as a CD-ROM and other optical media, and record information to the optical disk.

The hard disk drive 15, the magnetic disk drive 16, and the optical disk drive 17 are respectively connected to the system bus 10 by a hard disk drive interface 18, a magnetic disk drive interface 19, and an optical disk drive interface 20.

Also, the computing system may further include an external memory 21 as a storage means. The external memory 21 may be connected to the system bus 10 via an input/output interface 24.

The drives described above and related computer readable media from and to which information is read out and recorded by the drives provide nonvolatile storage of a computer executable command, a data structure, a program module, and other data.

Although the hard disk drive 15, the magnetic disk drive 16, and the optical disk drive 17 are described herein as illustrative computing environments, other types of computer readable media, including a magnetic cassette, a flash memory card, a DVD, a Bernoulli cartridge, a RAM, a ROM, and the like, configured to store data may be used.

Program coding means, such as an OS 13b, one or more application programs 13c, other program modules 13d, and one or more program modules including program data 13e, configured to be loaded and executed by the processing unit 11 may be stored in the hard disk drive 15, the magnetic disk drive 16, the optical disk drive 17, the ROM 12a, or the RAM 12b.

Further, the computing system may receive a command and information from a user via other input devices 22 such as a keyboard, a pointer, a microphone, a joystick, a game pad, a scanner, and the like. The input devices 22 may be connected to the processing unit 11 via the input/output interface 24 connected to the system bus 10.

The input/output interface 24 may be logically represented by any of a wide variety of different interfaces such as a serial port interface, a PS/2 interface, a parallel port interface, a USB interface, and an IEEE 1394 interface (i.e., a FireWire interface), or may be logically represented by a combination of different interfaces.

In addition, the computing system to which the present invention is applied may further include a display device 26 such as a monitor or an LCD or an audio device 27 such as a speaker or a microphone. The display device 26 and the audio device 27 are connected to the system bus 10 via a video/audio interface 25.

For example, other peripheral output devices (not illustrated) such as a speaker and a printer may also be connected to a computer system. The video/audio interface 25 may include an HDMI, a GDI, and the like.

Also, the computing system that executes the present invention may be connected to a network such as an office-broadband or company-broadband computer network, a home network, an intranet, and/or the Internet. The computer system may exchange data with external sources such as a remote computer system, a remote application, and/or a remote database via the above networks.

For this, the computing system to which the present invention is applied includes a network interface 27 configured to receive data from an external source and/or transmit data to the external source.

In the present invention, the computing system may transmit and receive information to and from a device at a remote place through the network interface 27. For example, when the computing system refers to the user terminal device 100, the computing system may transmit and receive information to and from the service device 400 via the network interface 27.

Conversely, when the computing system refers to the service device 400, the computing system may transmit and receive information to and from the user terminal device 100 via the network interface 27. The network interface 27 may be represented as a logical combination of one or more software and/or hardware modules such as a network interface card and an NDIS stack.

Likewise, the computer system receives data from an external source or transmits data to the external source via the input/output interface 24. The input/output interface 24 may be connected to a modem 23 (e.g., a standard modem, a cable modem, or a DSL modem) and may receive data from the external source and/or transmit data to the external source via the modem 23.

FIG. 12 illustrates an operating environment suitable to the present invention. However, a principle of the present invention may be employed in any system capable of implementing the principle of the present invention by being properly modified when necessary. The environment illustrated in FIG. 12 is merely illustrative and does not illustrate even a small part of a wide variety of environments in which the principle of the present invention may be implemented.

Further, various pieces of information generated when an advertisement providing program of the present invention is executed may be stored in any computer readable medium related to the computing system in FIG. 8 and accessed.

For example, some program modules and some program data related thereto may be included in the OS 13b, the application programs 13c, the program modules 13d, and/or program data 13e to be stored in the system memory 12.

Also, when a mass storage device such as a hard disk is connected to the computing system, the program modules and the program data related thereto may be stored in the mass storage device.

In a network environment, program modules related to the present invention or some of the program modules may be stored in a remote computer system connected thereto via the modem 23 of the input/output interface 24 or the network interface 25, e.g., in a remote memory storage device such as a system memory and/or a mass storage device related to a computing system of the advertisement target application server 300. Execution of the modules may be performed in a distributed environment as described above.

As described above, this specification includes details of a plurality of specific implementations. However, the details are not limiting to any of the scope of the invention or claims but should rather be understood as describing features that particular embodiments of particular invention may have. Particular features described herein in the context of separate embodiments may be implemented in combination in a single embodiment.

Conversely, various features described in the context of a single embodiment may be implemented separately or in any suitable lower-level combinations in a plurality of embodiments. Further, features may be claimed as operating in particular combinations and may be described as claimed as above at an early stage. However, one or more features may be excluded from the claimed combinations in some cases, and the claimed combinations may be changed to lower-level combinations or modifications of the lower-level combinations.

Likewise, although operations are illustrated in the drawings in specific orders, it should be understood that the operations do not have to be performed in the illustrated specific orders or sequential orders or that all of the illustrated operations have to be performed to obtain a preferred result. In a particular case, multitasking and parallel processing may be advantageous.

Also, detachment of various system components in the embodiments described above should be understood as not being required in all of the embodiments, and it should be understood that the program components and the systems described herein may be generally integrated with a single software product or packaged to multi-software products.

The description herein proposes the best mode of the present invention for describing the present invention and provides an example that enables one of ordinary skill in the art to which the present invention pertains to manufacture and use the preset invention. The specification written in this way does not limit the present invention by specific terms proposed herein.

Consequently, although the present invention has been described in detail with reference to the embodiments described above, one of ordinary skill in the art to which the present invention pertains may alter, change, and modify the embodiments without departing from the scope of the present invention.

Consequently, the scope of the present invention should be defined by the claims below instead of the embodiments described herein.

The present invention relates to an advertisement providing method and a service device and a user terminal device for performing the same. A service device may use authentication based information to target customers, set advertisement conditions, and send the advertisement conditions to a service application in the user terminal device. The service application may extract non-authentication based information of the targeted customers and provide an advertisement to an application provided by other people.

In this way, the present invention can expand an advertisement medium to various applications operated by a third party and enables an advertisement target application to provide a targeted advertisement without collecting personal information or location information by information on conditions for providing an advertisement being pre-stored in a user terminal device. This can soon contribute to developing the service industry. In addition, the present invention is industrially applicable due to having sufficient marketability or commercial value and practically and clearly being able to be practiced.

What is claimed is:

1. An information providing method of a service device connected to a user terminal device, the method comprising:
    extracting a target customer list based on authentication-based information that is information associated with customers already authenticated in a service provided by the service device;
    sending a request for non-authentication-based information to a target user terminal device corresponding to the target customer list extracted based on the authentication-based information to allow providing of target information using the non-authentication based information instead of the authentication-based information, wherein the target user terminal device includes a service application provided by the service device, and wherein the non-authentication-based information is a combination of (i) information generated without user authentication and without collection of personal information in the target user terminal device and (ii) information corresponding to the target customer list, and wherein the non-authentication-based information includes one or more of app activity information by operation of the service application, information-specific user identification information related to an operating system of the target user terminal device, and communication module information installed in the target user terminal device; and
    receiving the non-authentication-based information from the target user terminal device.

2. The method of claim 1, further comprising:
    transmitting the received non-authentication-based information to a server such that the server provides the target information an based on the non-authentication-based information through an information application installed in the target user terminal device.

3. An information providing method of a user terminal device connected to a service device, the method comprising:
    receiving condition information from the service device, wherein the service device extracts a target customer list based on authentication-based information and transmits the condition information to a target user terminal device corresponding to the target customer list extracted based on the authentication-based information, and wherein the authentication-based information is information associated with customers already authenticated in a service provided by the service device;
    extracting non-authentication-based information when the condition information is satisfied, wherein the target user terminal device includes a service application provided by the service device, and wherein the nonauthentication-based information is a combination of (i) information generated without user authentication and without collection of personal information in the target user terminal device and (ii) information corresponding to the target customer list, and wherein the non-authentication-based information includes one or more of app activity information by operation of the service application, information-specific user identification information related to an operating system installed in the target user terminal device, and communication module information of the target user terminal device; and providing target information based on the extracted non-authentication-based information instead of the authentication-based information.

4. The method of claim 3, further comprising:

when the condition information is received from the service device, and when there is a request from an information application installed in the target user terminal device, determining, at the service application, whether the condition information is satisfied.

5. A user terminal device comprising:

a storage configured to store a service application provided by a service device; and a processor configured to execute instructions stored in the storage and to:
    receive a request for non-authentication-based information or condition information from the service device,
    when the request for non-authentication-based information is received, extract the non-authentication-based information and transmit the extracted non-authentication-based information to the service device to allow providing of target information using the non-authentication-based information instead of authentication-based information, and
    when the condition information is received and satisfied, extract the non-authentication-based information and provide the target information based on the non-authentication-based information instead of the authentication-based information, wherein the service device extracts a target customer list based on the authentication-based information and transmits the request for non-authentication-based information or the condition information to a target user terminal device corresponding to the target customer list extracted based on the authentication-based information, wherein the authentication-based information is information associated with customers already authenticated in a service provided by the service device, and wherein the non-authentication-based information is a combination of (i) information generated without user authentication and without collection of personal information in the target user terminal device and (ii) information corresponding to the target customer list, and wherein the non-authentication-based information includes one or more of app activity information by operation of the service application, information-specific user identification information related to an operating system installed in the target user terminal device, and communication module information of the target user terminal device.

\* \* \* \* \*